United States Patent [19]

Van Dest

[11] Patent Number: 4,799,402
[45] Date of Patent: Jan. 24, 1989

[54] TRANSMISSION DEVICE FOR A FRONT WHEEL DRIVE VEHICLE

[75] Inventor: Jean Claude Van Dest, Saintry s/Seine, France

[73] Assignee: Glaenzer Spicer, Poissy, France

[21] Appl. No.: 42,956

[22] Filed: Apr. 27, 1987

[30] Foreign Application Priority Data

Apr. 25, 1986 [FR] France .................. 86 06022

[51] Int. Cl.⁴ .................................... F16H 37/08
[52] U.S. Cl. ........................................ 74/701; 74/713
[58] Field of Search ................. 74/701, 710 S, 711, 74/713, 740

[56] References Cited

U.S. PATENT DOCUMENTS

| 1,322,689 | 11/1919 | Griffing | 74/710.5 X |
|---|---|---|---|
| 2,102,973 | 12/1937 | Porsche | 74/713 |
| 2,187,843 | 1/1940 | Rzeppa | 74/713 |
| 3,118,515 | 1/1964 | Kraus et al. | 180/73 |
| 3,191,708 | 6/1965 | Simonds et al. | 74/701 X |
| 3,327,556 | 6/1967 | Blavette | 74/701 |
| 3,848,431 | 11/1974 | Takahashi et al. | 64/27 NM |
| 4,163,400 | 8/1979 | Fisher et al. | 74/710.5 X |
| 4,445,400 | 5/1984 | Sullivan et al. | 74/710.5 X |
| 4,483,408 | 11/1984 | Yazaki | 74/701 X |
| 4,673,055 | 6/1987 | Yamaoka et al. | 74/701 X |

FOREIGN PATENT DOCUMENTS

| 0090944 | 2/1983 | European Pat. Off. . | |
|---|---|---|---|
| 186135 | 7/1956 | Fed. Rep. of Germany | 74/713 |
| 1115192 | 11/1954 | France . | |
| 1156754 | 9/1956 | France . | |
| 812611 | 3/1981 | U.S.S.R. | 74/710.5 |
| 846893 | 7/1981 | U.S.S.R. | 74/713 |
| 1522734 | 8/1978 | United Kingdom . | |
| 2136373 | 9/1984 | United Kingdom . | |
| 2181501 | 4/1987 | United Kingdom | 74/713 |

OTHER PUBLICATIONS

Design Engineering, Feb. 1981, pp. 49–50, London, GB; "Viscous Coupling Development for Automotive Transmissions".

Primary Examiner—Leslie A. Braun
Assistant Examiner—Dwight G. Diehl
Attorney, Agent, or Firm—Wenderoth, Lind & Ponack

[57] ABSTRACT

A drive unit and which permits a convenient adaptation to various configurations. This sub-assembly mainly comprises a hollow shaft (6) driven by the output member (4) of the unit, and a differential (7) disposed in the hollow shaft and whose two output elements (11, 12) are connected to two homokinetic joints (14, 21). This device may also include a torsional vibration damping device (5) and a mechanism (23) for controlling the differential.

20 Claims, 2 Drawing Sheets

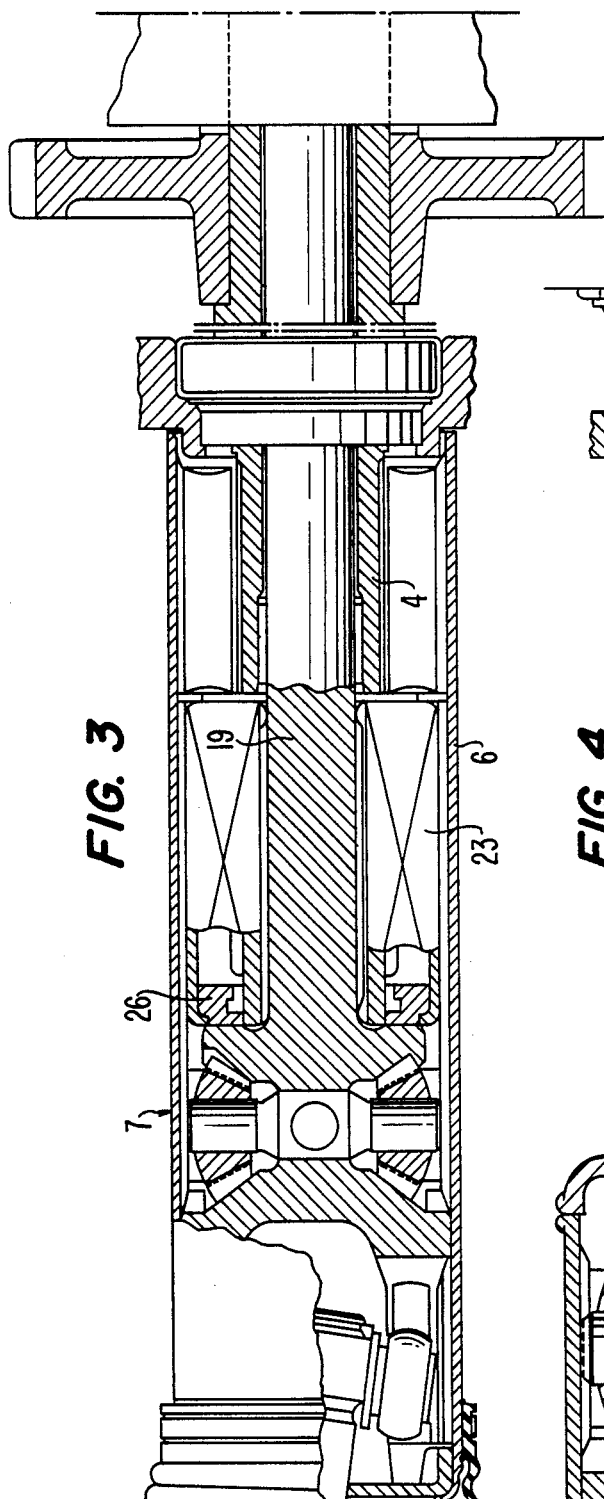
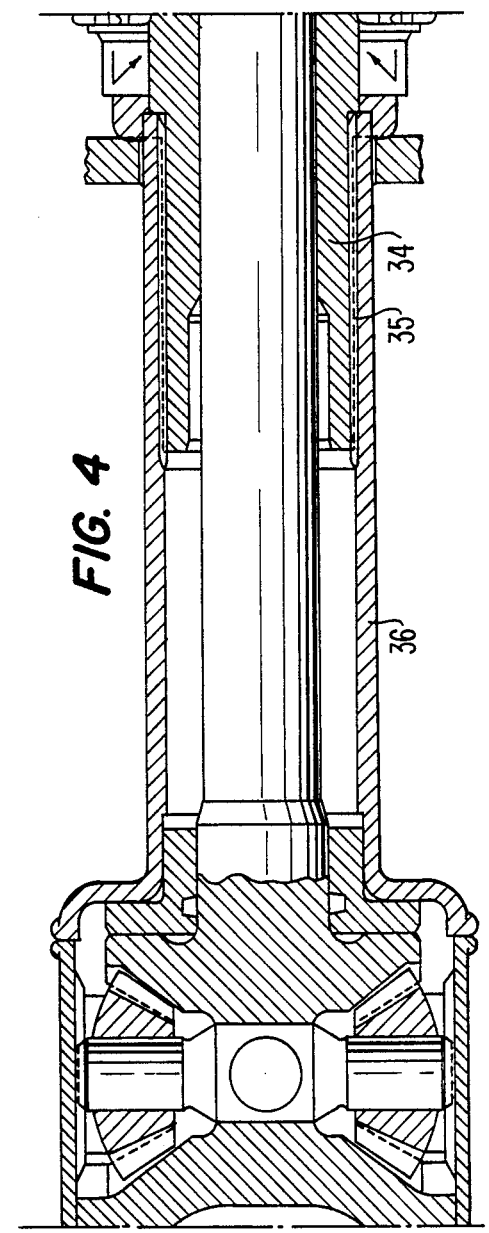

TRANSMISSION DEVICE FOR A FRONT WHEEL DRIVE VEHICLE

BACKGROUND OF THE INVENTION

1. Field of the Invention

The present invention relates to transmission devices for vehicles, and in particular for front wheel drive vehicles.

2. Description of the Prior Art

The recent evolution of such transmissions leads to the contemplation of different types of configurations.

First of all, when the engine is disposed transversely relative to the longitudinal axis of the vehicle, one has been led, in order to be able to use two short transmission shafts of equal length, to provide at the output of the differential integrated in the motor-drive unit, a relay shaft located on the side of the differential remote from the associated driving wheel, this relay shaft being supported by an intermediate bearing. This solution is not satisfactory, since the placement of the intermediate bearing is not always easy and the assemby is consequently complicated.

There may also be provided an option consisting in incorporating in the differential a control or locking device. The control device may be a coupling having a limited slip, such as that known for example under the trade mark VISCODRIVE. The drawback of such a solution resides mainly in the fact that the part of the case containing the gear box and the differential must be modified, which of course complicates the manufacturing operations and increases the cost.

It has also been envisaged to integrated homokinetic joints in differentials, but this arrangement presents three essential drawbacks.

First, an assembly constituted by the gear box and one or two pre-mounted transmission shafts is space-consuming and therefore difficult to transport. Furthermore, such an arrangement is relatively fragile.

Second, as the sealing of the gear box is ensured not only by rotating seals but also by the rubber bellows of the joints, a deterioration of these bellows may result in a loss of oil of the gear box and possibly its deterioration.

Third, the replacement of a bellows or of a transmission shaft involves considerable dismantling.

SUMMARY OF THE INVENTION

An object of the invention is therefore to propose a transmission device, in particular for a front wheel drive vehicle, which affords large possibilities of adaptation to different configurations at lower cost.

The invention provides for this purpose a transmission device located between an output member of an enginedrive unit and transmission shafts connected to the driving wheels of a motor vehicle. Characterized in that it comprises a hollow shaft driven by the output member of the engine-drive unit, a differential mechanism disposed in the hollow shaft and comprising an input element integral with the hollow shaft and two coaxial output elements each connected to a joint associated with one of said transmission shafts, one of the two output members of the differential mechanism being connected to the associated joint through a shaft extending inside the hollow shaft.

According to other features :

one of the output elements of the differential is in one piece with or fixed to one of the associated homokinetic joint elements ;

a device controlling the differential is providied between one of the elements of this differential and the hollow shaft ;

the hollow shaft is connected to the output member of the engine-drive unit by splines or a vibration damping device ;

the place for the differential control device is provided between the differential and the damping device.

BRIEF DESCRIPTION OF THE DRAWINGS

A better understanding of the invention will be had from the following description which is given solely by way of example with reference to the accompanying drawings, in which :

FIG. 3 is a view of a detail of a modification of the device of FIG. 2, and

FIG. 4 is a partial sectional view of another modification.

DETAILED DESCRIPTION OF THE PREFERRED EMBODIMENTS

Figure 1:
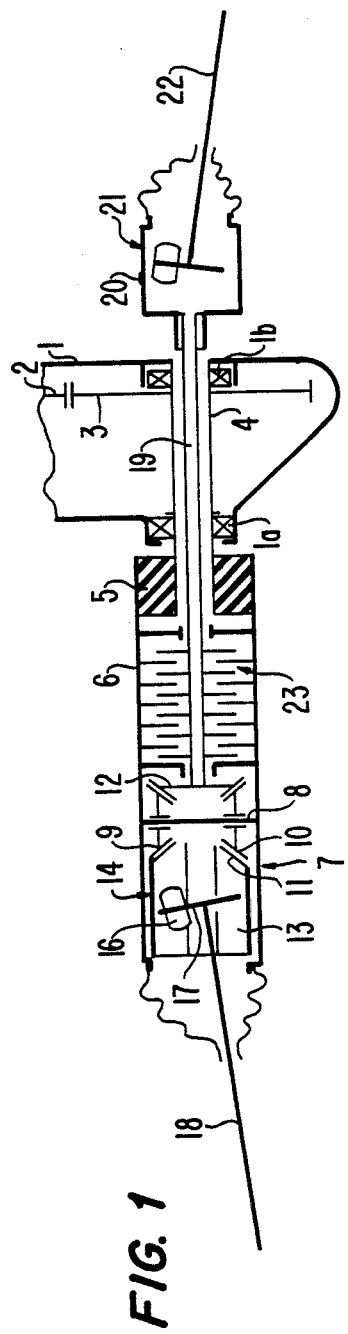
FIG. 1 is a diagrammatic view of a transmission device according to the invention.

FIG. 1 shows a part of the case 1 of an enginedrive unit whose output member is designated by the reference 4. This output member is a hollow shaft integral with a gear pinion 3 engaged with a gear pinion 2 of the gear box and it is supported in the case 1 by two bearings 1a, 1b. This output member 4 is connected through a vibration damping device 5 constituted by a mass of elastomer, to a second hollow shaft 6 of larger diameter in which a plurality of components of the transmission are disposed.

Firstly, this hollow shaft 6 constitutes an input element for a differential mechanism 7. For this purpose, it is integral with a planet gear carrier 8 in which are rotatively mounted planet gears 9, 10 engaging with two sun gears 11, 12 which are in opposed and coaxial relation to each other. These two sun gears 11, 12 constitute the output elements of the differential mechanism.

The sun gear 11, the most remote from the engine-drive unit, is in one piece with or fixed to one, 13, of the elements of a homokinetic joint 14. In the illustrated embodiment, it is in one piece with a tulip element 13 of a tripod joint, this tulip element defining three pairs of raceways 15 in which are received rollers 16 carried by trunnions or a tripod 17. The tripod being itself integral with a transmission shaft 18 which is connected by another homokinetic joint (not shown) to a driving wheel of the vehicle. The joint 14 is a sliding joint.

The other sun gear 12 is integral with a shaft 19 which extends axially in the hollow shafts 4, 6 and is connected at its opposite end to the tulip element 20 of a second sliding homokinetic joint 21, for example of the tripod type. The second homokinetic joint is itself connected by a transmission shaft 22 to the second driving wheel of the vehicle (not shown).

Also received in the hollow shaft 6 is a device 23 for controlling and differential and constituted in the illustrated embodiment by a coupling having a limited slip, for example of the type known under and trade mark VISCODRIVE. Such a device is well known and therefore need not be described in detail.

Other control devices or locking devices for the differential may moreover be employed instead of this coupling, provided between the shaft 19 and the hollow shaft 6.

Figure 2:
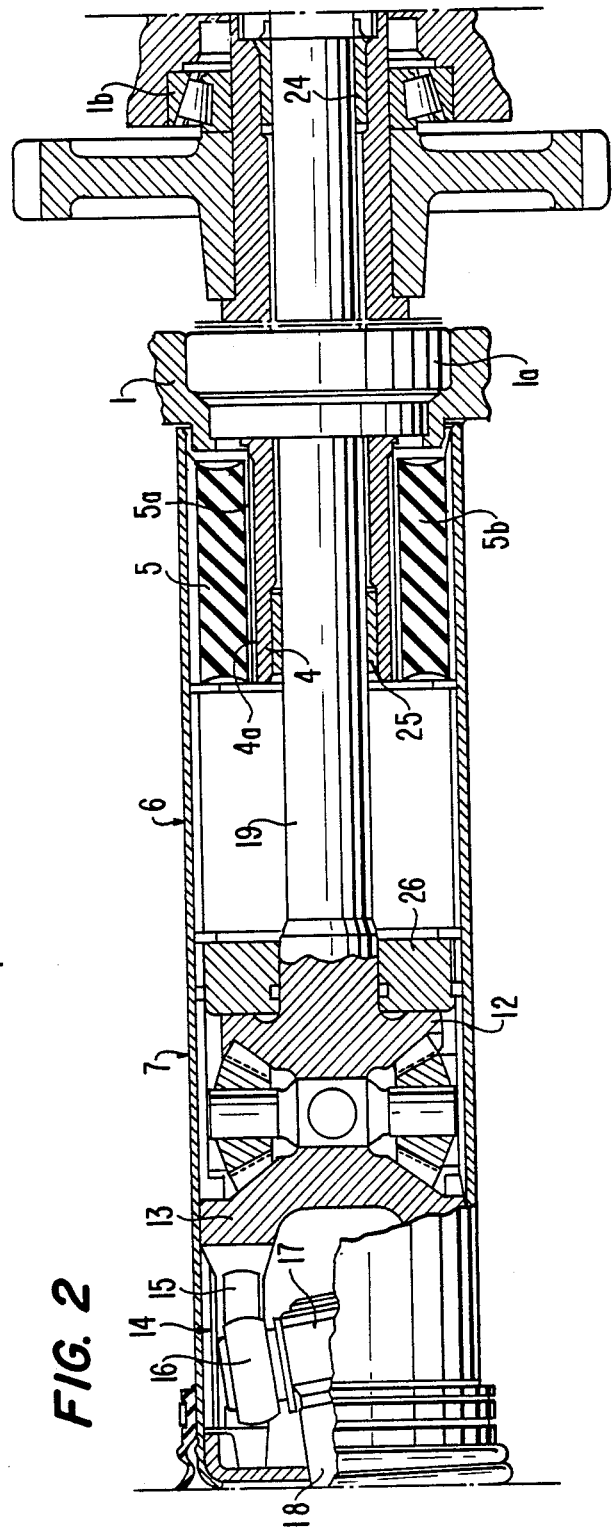
FIG. 2 is a longitudinal sectional view of a detailed embodiment of such a device.

FIG. 2 shows a more detailed embodiment of a device according to the invention, the corresponding elements being designated therein by the same reference numerals. It will merely be mentioned that the torsional vibration damping or filtering device comprises a splined inner cylindrical armature 5a cooperating with corresponding splines 4a provided on the hollow shaft 4 and a mass of elastomer 5b which is bonded or vulvanized, on one hand, to the inner armature 5a, and, on the other hand, to the hollow shaft 6 of larger diameter.

Two bearings 24, 25 are also provided between the shaft 19 integral with the sun gear 12 and the hollow shaft 4 mounted in the gear box by means of rolling bearings 1a, 1b.

It can be seen in FIG. 2 that the volume between the differential mechanism 7 and the vibration damping device 5 is available and partly occupied by a bearing 26 disposed between the tubular shaft 6 and the central shaft 19. This available volume may also be occupied, as shown in FIG. 3, by the control device of the differential 23 constituted for example by a coupling having a limited slip diagrammatically represented in this FIG. 3. In this case, the bearing 26 is incorporated in the control device 23.

In FIGS. 2 and 3, the hollow shaft 6, the differential mechanism 7 and the integrated homokinetic joint 14 and, as the case may be, the vibration damping device 5 and/or the device 23 controlling the differential constitute with the transmission shafts adapted to be connected to the driving wheels. an autonomous sub-assembly which may be easily mounted on the engine-drive unit.

Such an arrangement offers many advantages, among which:

it permits the attainment of lower manufacturing and assembly costs, since the same case of the engine drive unit or of the gear box may be used, while permitting various options depending on whether the sub-assembly added to this unit comprises or does not comprise a vibration damping device and/or a control device of the differential;

a substantial economy results also from the fact that one of the two homokinetic joints is integrated in this sub-assembly;

the support of the intermediate shaft required in the prior art is also eliminated since the hollow shaft 6, which is mounted in overhanging relation, nonetheless affords sufficient rigidity, it being assisted in this respect by the shaft 19 held by two bearings 24 and 25;

the assembly times are reduced;

the whole of the gear box is independent from the various possible options; moreover, this gear box may be terminated and tested completely before the mounting of the transmissions;

the fact that this gear box be separated from the case in which is received the homokinetic joint, although the latter is integrated in the differential, is important since it is certain that this gear box is correctly lubricated, and there is no risk of it being damaged in the event of loss of lubricant in the region of the bellows of the homokinetic joints;

owing to the presence of the bearings 24, 25 and the bearing 26, the guiding arrangements are improved and this results in reduced noise;

the coupling device 23 having a limited slip may be produced in a standard manner since it is no longer dependent on the position of the differential; it may in particular be designed in the form of a separate cartridge which is pre-mounted, the adjustment as concerns the torque being effected by suitably choosing the number of discs and consequently the length of the cartridge, and the rate of filling of this cartridge with liquid based on silicon or the like;

the modalities of the packing and transport are substantially improved since the whole of the engine-drive unit or of the gear box has not projecting part and the sub-assembly defined hereinbefore may also be transported under satisfactory conditions.

FIG. 4 shows another simplified modifications in which no vibration damping device is provided and no place is provided for receiving a coupling device having a limited slip. In this case, the hollow shaft 36 may have a smaller diameter in a part of its length and it is simply connected to the second hollow shaft 34 by splines 35, the arrangement being consequently simplified.

As other modifications, it will be observed that this differential may be of a type different from that illustrated, for example of the epicyclic type, and that other sliding homokinetic joints may be used, for example the "RZEPPA" joints having balls. While the present invention has been described with reference to the foregoing embodiments, it will be understood by those skilled in the art that various changes and modifications may be made thereto which fall within the scope of the appended claims.

What is claimed is:

1. A transmission device disposed between an output member of an engine-drive unit and transmission shafts connected to driving wheels of a motor vehicle, said device comprising a first hollow shaft drivingly connected to the coaxial with a second hollow shaft comprising an output member of the engine-drive unit, means comprising a pair of bearings disposed within a case of the engine-drive unit for supporting the second shaft, said first shaft being disposed outside of the case and outside of a space defined between the pairs of bearings, a differential mechanism disposed in said first hollow shaft and comprising an input element integral with the first hollow shaft and two coaxial output elements each connected to a joint associated with a respective one of said transmission shafts, one of the two output elements of the differential mechanism being connected to the associated joint through an intermediate shaft extending inside said first hollow shaft.

2. A device according to claim 1, wherein one of the output elements of the differential is connected to rotate with one of the elements of the associated joint, the associated joint comprising a homokinetic joint.

3. A device according to claim 1, comprising a device for controlling the differential between one of the elements of said differential and said first hollow shaft, the differential controlling device together with the first hollow shaft, the differential mechanism, the two coaxial output elements and the intermediate shaft comprising a sub-assembly of the transmission device.

4. A device according to claim 1, wherein the first hollow shaft is connected to the second hollow shaft by splines, the first hollow shaft, the differential mechanism, the two coaxial ouptut elements and the intermediate shaft together comprising a sub-assembly of the transmission device.

5. A device according to claim 1, wherein the first hollow shaft is connected to the second hollow shaft by a vibration damping device.

6. A device according to claim 5, comprising a device for controlling the differential, said device located between one of the elements of said differential and said first hollow shaft, the place for the control device of the differential being provided between the differential and the damping device.

7. A device according to claim 1, wherein the intermediate shaft extends inside the first and second hollow shafts and is supported in the second hollow shaft constituting the output member of the engine-drive unit by two bearings.

8. A device according to claim 1, wherein a bearing is interposed between the first hollow shaft and the intermediate shaft.

9. A transmission device disposed between an output member of an engine-drive unit and transmission shafts connected to driving wheels of a motor vehicle, said device comprising a first hollow shaft drivingly connected to and coaxial with a second hollow shaft comprising an output member of the engine-drive unit, a differential mechanism disposed in said first hollow shaft and comprising an input element integral with the first hollow shaft and two coaxial output elements each connected to a joint associated with a respective one of said transmission shafts, one of the two output elements of the differential mechanism being connected to the associated joint through an intermediate shaft extending inside said first hollow shaft, the intermediate shaft extending inside the first and second hollow shafts and being supported in the second hollow shaft constituting the output member of the engine-drive unit by two bearings.

10. A device according to claim 9, wherein one of the output elements of the differential is connected to rotate with one of the elements of the associated joint, the associated joint comprising a homokinetic joint.

11. A device according to claim 9, comprising a device for controlling the differential between one of the elements of said differential and said first hollow shaft, the differential controlling device together with the first hollow shaft, the differential mechanism, the two coaxial output elements and the intermediate shaft comprising a sub-assembly of the transmission device.

12. A device according to claim 9, wherein the first hollow shaft is connected to the second hollow shaft by splines, the first hollow shaft, the differential mechanism, the two coaxial output elements and the intermediate shaft together comprising a sub-assembly of the transmission device.

13. A device according to claim 9, wherein the first hollow shaft is connected to the second hollow shaft by a vibration damping device.

14. A device according to claim 13, comprising a device for controlling the differential, said device located between one of the elements of said differential and said first hollow shaft, the control device of the differential being provided between the differential and the damping device.

15. A device according to claim 9, wherein the hollow shaft constituting the output member of the engine-drive unit is mounted in a case of the engine-drive unit by two bearings.

16. A device according to claim 9, wherein a bearing is interposed between the first hollow shaft and the intermediate shaft.

17. A transmisison device mountable between an output member of an engine-drive unit and transmission shafts connected to driving wheels of a motor vehicle, said device including means comprising a hollow shaft for coaxially surrounding and being drivingly connected to the output member of the engine-drive unit, a differential mechanism disposed in said hollow shaft and comprising an input element integral with the hollow shaft and two coaxial output elements each connected to a joint associated with a respective one of said transmission shafts, one of the two output elements of the differential mechanism being connected to the associated joint through an intermediate shaft extending inside said hollow shaft.

18. A device according to claim 17, wherein one of the output elements of the differential is connected to rotate with one of the elements of the associated joint, the associated joint comprising a homokinetic joint.

19. A device according to claim 17, comprising a device for controlling the differential, said differential controlling device being located between one of the elements of said differential and said first hollow shaft.

20. A device according to claim 17, further comprising means for connecting the hollow shaft to the output member of the engine-drive unit, said connecting means comprising a vibration damping device, the transmission device further comprising a device for controlling the differential, said differential controlling device being located between one of the elements of said differential and said hollow shaft, the control device of the differential being located between the differential and the damping device.

* * * * *